(12) United States Patent
Shyu

(10) Patent No.: US 8,661,807 B2
(45) Date of Patent: Mar. 4, 2014

(54) POTENTIAL ENERGY REGENERATING SYSTEM AND METHOD AND ELECTRICITY REGENERATING SYSTEM AND METHOD

(76) Inventor: Yuh-Huei Shyu, Taipei (TW)

( * ) Notice: Subject to any disclaimer, the term of this patent is extended or adjusted under 35 U.S.C. 154(b) by 855 days.

(21) Appl. No.: 12/923,049

(22) Filed: Aug. 31, 2010

(65) Prior Publication Data

US 2012/0047885 A1    Mar. 1, 2012

(30) Foreign Application Priority Data

Dec. 11, 2009  (TW) ............................ 98142565 A

(51) Int. Cl.
*F03D 9/00* (2006.01)

(52) U.S. Cl.
USPC .............................. 60/398; 92/130 B; 290/1 R

(58) Field of Classification Search
USPC ............. 60/398, 532, 721; 185/4, 6; 417/149, 417/229, 249, 328; 92/130 B; 290/1 R
See application file for complete search history.

(56) References Cited

U.S. PATENT DOCUMENTS

| | | | | |
|---|---|---|---|---|
| 213,173 A * | 3/1879 | Coates | ............................ | 417/328 |
| 640,324 A * | 1/1900 | Sample | ............................ | 417/328 |
| 697,595 A * | 4/1902 | Anderson | ..................... | 417/328 |
| 743,285 A * | 11/1903 | Hubartt | ........................ | 417/328 |
| 789,629 A * | 5/1905 | Ruff et al. | ..................... | 417/328 |
| 1,459,645 A * | 6/1923 | Wilson | ............................ | 60/640 |
| 2,452,973 A * | 11/1948 | Weir | .............................. | 417/328 |
| 2,681,012 A * | 6/1954 | Hackman | ....................... | 417/328 |
| 4,052,849 A * | 10/1977 | Dumbaugh | ..................... | 60/325 |
| 4,380,419 A * | 4/1983 | Morton | ........................ | 417/334 |
| 4,388,044 A * | 6/1983 | Wilkinson | ..................... | 417/38 |
| 4,409,489 A * | 10/1983 | Hayes | ............................ | 290/1 R |
| 4,509,329 A * | 4/1985 | Breston | ......................... | 60/531 |
| 4,514,977 A * | 5/1985 | Bowen | .......................... | 60/398 |
| 5,157,922 A * | 10/1992 | Baruch | .......................... | 60/325 |
| 5,355,674 A * | 10/1994 | Rosenberg | ..................... | 60/325 |
| 5,988,991 A * | 11/1999 | Tsai | .............................. | 417/328 |
| 6,232,671 B1 * | 5/2001 | Gottfried, Jr. | ................. | 290/1 R |
| 7,000,267 B2 * | 2/2006 | Chesters | .......................... | 4/620 |
| 7,402,028 B2 * | 7/2008 | Wong | ............................ | 417/328 |
| 8,089,167 B2 * | 1/2012 | Alvite | ........................... | 290/1 C |
| 8,127,542 B1 * | 3/2012 | Dolcimascolo | ................ | 60/398 |
| 8,297,052 B2 * | 10/2012 | Lu | ................................ | 60/398 |
| 2005/0052028 A1 * | 3/2005 | Chiang | ........................ | 290/1 R |
| 2006/0216163 A1 * | 9/2006 | Park | .............................. | 417/329 |
| 2007/0096470 A1 * | 5/2007 | Cole | ............................. | 290/1 R |

* cited by examiner

Primary Examiner — Thomas E Lazo
(74) Attorney, Agent, or Firm — Bacon & Thomas, PLLC

(57) ABSTRACT

The present invention provides a potential energy regenerating system and method and an electricity regenerating system and method. The potential energy regenerating system comprises: a liquid storage bag module, having a compressible liquid storage bag; a pipe line module, including a liquid access opening switch control device and a pipe line connected to the liquid access opening control device; a liquid storage tank module, including a liquid storage tank with a bottom higher than the highest position where the liquid storage bag module can reach; and a squeezing weight module, including a squeezing weight mass and a control device, wherein the squeezing weight mass is placed on a top of the compressible liquid storage bag, and the control device controls to lift and release the squeezing weight mass. The electricity regenerating system uses the foregoing potential energy regenerating system to generate electricity.

7 Claims, 8 Drawing Sheets

POTENTIAL ENERGY REGENERATING SYSTEM AND METHOD AND ELECTRICITY REGENERATING SYSTEM AND METHOD

BACKGROUND OF THE INVENTION

1. Field of the Invention

The present invention relates to a potential energy regenerating system and method and an electricity regenerating system and method. Particularly, the potential energy regenerating system and method relates to a system and method capable of generating and increasing a liquid's potential energy by repeatedly using a liquid and having the gravitation as its energy source, and the electricity regenerating system and method relates to a system and method for regenerating electricity by using a liquid-level difference generated by foregoing potential energy regenerating system.

2. Description of the Related Art

For a long time, Pascal's principle is used to lift up a large piston with a small piston. On an application of a hydraulic lift, as long as a smaller push-down force is applied on the small piston, a larger lift-up force will then be generated on the large piston.

However, it is easy to neglect that Pascal's principle can be used to increase an incompressible liquid's potential energy by universal gravitation.

FIG. 1 is a schematic view of a hydraulic lift, wherein the area of a large piston is $A_1$, and the area of a small piston is $A_2$. If a push-down force $F_1$ is exerted on the large piston, a lift-up force $F_2$ will then be generated on the small piston, and $$F_1/A_1 = F_2/A_2 \quad (1)$$

$$A_1 d_1 = A_2 d_2 \quad (2)$$

wherein $d_1$ is the displacement of the large piston, and $d_2$ is the displacement of the small piston. An Equation (3) can be derived from Equations (1) and (2) as follows:

$$d_2 = (A_1/A_2) d_1 \quad (3)$$

Equation (3) shows that the displacement of the small piston is equal to the area ratio of the large piston to the small piston multiplied by the displacement of the large piston. For example, if $A_1 = 1\ m^2$, $A_2 = 100\ cm^2$, $d1 = 1\ m$, then $$(A_1/A_2)d_1 = (1\ m^2/100\ cm^2) \times 1\ m$$
$$= (10000\ cm^2/100\ cm^2) \times 1\ m$$
$$= 100\ m$$

That is, a force is exerted downwards on the large piston to move it down 1 m. Under this case, a lift-up force is generated on the small piston to move it up 100 m.

For a long time, using a large piston to lift up a small piston does not meet economic efficiency, so such an application is seldom put into practice.

FIG. 2 is a schematic view showing that a hydraulic compressor transmits a liquid using Pascal's principle.

A mass T having M Kgw is placed on the large piston. Due to gravity, a constant push-down force $F_1 = Mg$ is exerted on the large piston, wherein g is acceleration of gravity (=9.8 m/s²). Furthermore, a lift-up force $F_2$ will be generated on the small piston. When the small piston is lifted up to a height of h meters, the hydraulic lift is no longer in an enclosed state, but an opening on a pipe wall where the small piston is located is provided to direct the liquid to a liquid tank.

As shown in FIG. 2, it is assumed that the liquid stored is pure water, and the area of the large piston $A_1 = 1\ m^2$, the area of the small piston $A_2 = 10\ cm^2 = 0.001\ m^2$.

Now, a push-down force is exerted on the large piston to move it down by 1 m. According to Pascal's principle, a lift-up force can be generated on the small piston to move it up by 1000 meters.

It is assumed that an opening is provided on a pipe wall located at a height of 100m in the pipe line where the small piston is located, and the opening is horizontally connected to a storage container (base area: 1 m², height: 1 m) through a pipe line.

It is assumed that a counterweight having 100 Kgw is placed on the large piston, and no object is put on the small piston. The counterweight exerts a force downwards on the large piston due to gravity. When the large piston is moved down by 1 m, liquid of 0.9 m³ out from pure water of 1 m³ below the large piston is squeezed into the liquid storage container having a height of 100 m. Another water of 0.1 m³ will remain at the bottom of the pipe line where the small piston is located. The change of potential energy of the entire system is as follows:

(1) When the counterweight moves down by 1 m, the potential energy thereof reduced is:

$$mgh = 100 \times g \times 1 = 100 \times 9.8 \times 1 = 980\ \text{(joules)}.$$

(2) Considering that water of 0.9 m³ is moved into the liquid storage container at a height of 100 m, the potential energy thereof increased is:

$$mgh = (0.9 \times 1{,}000) \times 9.8 \times 100$$
$$= 882{,}000 \text{(joules)}.$$

(3) Another water of 0.1 m³ will remain at the bottom of the pipe line where the small piston is located. A simple method for calculating the increased potential energy is to consider the entire weight to be concentrated at one point and thus, at its center of gravity. That is, it is concentrated at a height of 50 m. So, the potential energy thereof increased is:

$$mgh = (0.1 \times 1{,}000) \times 9.8 \times 50 = 49{,}000\ \text{(joules)}.$$

(4) The change of potential energy of the entire system is the increment of potential energy of water minus the decrement of potential energy of the counterweight, shown as:

$$882{,}000 + 49{,}000 - 980 = 930{,}020\ \text{(joules)}.$$

By observing the changes of potential energies in items (1), (2), and (3), it is found that with the modified structure of the hydraulic compressor and appropriate universal gravitation, the liquid can be moved up to the higher storage container and thus, the potential energy of the liquid is increased.

Although in FIG. 2, universal gravitation is used to transmit the liquid up to the higher storage container, there exists a considerable disadvantage. That is, when a liquid storage bag is filled with the liquid, it is quite easy to create more liquid's potential energy; however, it requires significant energy consumed to re-fill the liquid storage bag with the liquid. Consequently, it is not economic to use this structure to create the potential energy.

In view of the above disadvantage of the prior art, the present invention herein provides a potential energy regenerating system and method and an electricity regenerating system and method, wherein a compressible liquid bag is squeezed by appropriately directed universal gravitation, so that a liquid stored in a bag can be transmitted to a storage tank having a higher potential energy.

SUMMARY OF THE INVENTION

A main objective of the present invention is to provide a vertical-type liquid potential energy regenerating system, comprising:

a liquid storage bag module, including a compressible liquid storage bag device having a compressible liquid storage bag, a bottom of the compressible liquid storage bag being provided with an access opening, the compressible liquid storage bag device being in a vertical type;

a pipe line module, including a liquid access opening switch control device and a pipe line, one end of the liquid access opening switch control device having an access opening, the other end having two access openings, the liquid access opening switch control device being higher than the highest level that the compressible liquid storage bag can reach, the pipe line being in a U-shape and extending upwards to be connected with the liquid access opening switch control device;

a liquid storage tank module, including a liquid storage tank with a bottom higher than the highest position that the compressible liquid storage bag can reach, the liquid storage tank having a pipe line connected to the liquid access opening switch control device; and a squeezing weight module, including a squeezing weight mass and a control device, wherein the squeezing weight mass is placed on a top of the compressible liquid storage bag, and the control device allows the squeezing weight mass to be lifted and released.

The liquid is stored in a liquid storage bag which is compressible and has an access opening. Then, the compressible liquid storage bag is placed in a hydraulic compressor frame, from which its internal structure is detached. The purpose to put the compressible liquid storage bag in the container is that when the compressible liquid storage bag is squeezed, the compressible liquid storage bag can have a support to transmit the liquid in the bag to a liquid storage tank at a higher level. A squeezing weight mass used to squeeze the liquid storage bag is separated from the liquid storage bag. When the squeezing weight mass is released, the liquid storage bag is squeezed; and when the squeezing weight mass is lifted up the liquid flows into the liquid storage bag again due to the gravity of the liquid. The access opening of the liquid storage bag is controlled by the liquid access opening control device. The liquid access opening control device may be a mechanical device or be one controlled by a microcomputer, and has a function to control the liquid access opening to allow the liquid to flow in one way (FIG. 8 shows an embodiment).

The advantage of the present invention is that the squeezing weight mass and the liquid storage bag are separated. Therefore, it only consumes a little energy to lift up the squeezing weight mass. Then, the liquid storage bag is filled with the liquid again due to the gravity of the liquid. Next, the gravity of the squeezing weight mass is used to transmit the liquid to the storage tank at a higher level, so that the potential energy of the liquid can be increased.

Another objective of the present invention is to provide a vertical-type liquid potential energy regenerating method, which is applied to a vertical-type liquid potential energy regenerating system, the method comprising the steps of: lifting up a squeezing weight mass and locating the squeezing weight mass at a position above a liquid storage bag where the liquid storage bag can reach; making a liquid flow into the liquid storage bag through an access opening of the liquid storage bag, until the liquid storage bag is filled with the fluid or no more fluid flows into the liquid storage bag; and releasing the squeezing weight mass to make it squeeze the liquid storage bag.

The foregoing potential energy regenerating system squeezes the liquid storage bag with a freely falling body to increase the potential energy of the liquid. Furthermore, in another embodiment of the present invention which will be described later, a container receiving the liquid storage bag is obliquely placed on a support plate. Then, the squeezing weight mass slides or rolls due to gravity, so as to convert gravity into potential energy.

Another objective of the present invention is to provide an inclined-type liquid potential energy regenerating system, comprising:

a liquid storage bag module, including a compressible liquid storage bag device having a compressible liquid storage bag, a bottom of the compressible liquid storage bag being provided with an access opening;

an inclined plate module, including a rectangular inclined plate inclined by an appropriate angle with respect to the horizontal ground, the compressible liquid storage bag being obliquely placed on the rectangular inclined plate, and the access opening of the compressible liquid storage bag being adjacent to both ends of the rectangular inclined plate;

a pipe line module, including a liquid access opening switch control device and a pipe line, one end of the liquid access opening switch control device having an access opening, the other end having two access openings, the liquid access opening switch control device being higher than the highest level that the compressible liquid storage bag can reach, one end of the pipe line connected to the access opening at the bottom of the compressible liquid storage bag, the pip line being in a U-shape and extending upwards to be connected with the liquid access opening switch control device;

a liquid storage tank module, including a liquid storage tank with a bottom higher than the highest level that the compressible liquid storage bag can reach, the liquid storage tank having a pipe line which connects the outlet of the compressible liquid storage bag to the inlet of the liquid storage tank; and a squeezing weight module, including a squeezing weight mass and a control device, wherein the squeezing weight mass is placed on the rectangular inclined plate and located above the compressible liquid storage bag, and the control device allows the squeezing weight mass to be lifted and released.

A further objective of the present invention is to provide an inclined-type liquid potential energy regenerating method, which is applied to an inclined-type liquid potential energy regenerating system, the method comprising the steps of: lifting a squeezing weight mass and locating the squeezing weight mass on a top of the inclined plate where a liquid storage bag can reach; making liquid flow into the compressible liquid storage bag through an access opening of the compressible liquid storage bag until the compressible liquid storage bag is filled with the fluid or no more fluid flows into the compressible liquid storage bag; and releasing the squeezing weight mass.

The foregoing inclined-type liquid potential regenerating system squeezes the liquid storage bag in a sliding (or rolling) manner to transmit the liquid to a higher position.

Two identical inclined-type liquid potential energy regenerating systems are combined in symmetry to form a system having a seesaw structure. Since the left and right sides of the seesaw structure are symmetric and are independent inclined-type gravity to potential energy conversion systems, liquid in the liquid storage bags can be transmitted to the above liquid storage tank through the compressible liquid storage bags and the squeezing weight devices on the seesaw. Therefore, to make it becomes a potential energy regenerating system as long as the outlets of the above liquid storage tank have to be appropriately controlled so that the liquid in the liquid storage tank can alternately flow into the liquid storage bags on the right and left sides, resulting in an imbalance of torque to make the seesaw incline to one side. Using this simple technique, the right and left sides of the seesaw will alternately swing up and down, thus forming a potential energy regenerating system.

Another objective of the present invention is to provide a seesaw-type potential energy regenerating system, comprising:

a seesaw module, comprising a rectangular smooth plate, a center of which is placed on a base, so that both ends of the smooth plate can swing up and down, a partition device being provided on the center of the smooth plate for partitioning the smooth plate into two sides, each side of the smooth plate being provided with a baffle plate perpendicular to the smooth plate for stopping amass sliding down along the smooth plate, the baffle plate having an opening through which a pipe line can pass;

two liquid storage bag modules, each comprising a compressible liquid storage bag, placed on both sides of the plate of the seesaw module, respectively, a bottom of each compressible liquid storage bag having an access opening and fixed on a flat plate;

a liquid storage tank module, comprising a liquid storage tank with bottom higher than a liquid access opening switch control device, the liquid storage tank having an inlet and having two outlets at the bottom of the liquid storage tank, each having a pipe line, the two outlets being connected to the liquid input pipe lines of the liquid storage bags on the right and left sides, respectively, each of the outlets being provided with a plug connected to a control rope, for controlling the outlets to be open or closed, an outlet control rope connected to the liquid input pipe line of the right compressible liquid storage bag being connected to the left squeezing weight mass of the seesaw module, an outlet control rope connected to the liquid input pipe line of the left compressible liquid storage bag being connected to the right squeezing weight mass of the seesaw module, the plug having an appropriate weight, wherein when a control rope is released, a corresponding plug falls down to close a corresponding outlet, and when a control rope is pulled, a corresponded outlet is opened; and the liquid access opening switch control device, one end of which is connected to the access opening of the compressible liquid storage bag, the other end of which has two openings, wherein one opening is connected to the inlet of the liquid storage tank, and the other opening is connected to a corresponding outlet of the liquid storage tank, the liquid access opening switch control device allowing liquid to flow in one way.

By the inclined-type potential energy regenerating systems having a seesaw structure and formed by symmetry combination, a potential energy regenerating system is constructed. This potential energy regenerating system is a device having a seesaw structure which can swing up and down in turn between the right and left sides.

A further objective of the present invention is to provide a method of starting a potential energy regenerating system, comprising the steps of:

making the potential energy regenerating system be in a state that no liquid is contained;

using an external force to support the smooth plate of the seesaw module to be in a horizontal state, making the squeezing weight masses on both sides of the smooth plate of the seesaw module be biased to the center of the smooth plate, so that the plugs connected to the control ropes all block their corresponding outlets;

inputting an adequate amount of liquid from the inlet of the liquid storage tank; and removing the external force for support so that the torque on the smooth plate is in an imbalance state, and one of the control ropes opens a corresponding outlet to start the potential energy regenerating system.

The above potential energy regenerating system generates a liquid circulating system having a liquid-level difference. A liquid in a first compressible liquid storage bag is squeezed by a corresponding squeezing weight mass (the squeezing weight mass moves down due to universal gravitation) to transmit the liquid in the bag to a liquid storage tank at a higher level. When the squeezing weight mass stops squeezing the bag, a corresponding outlet at the bottom of the liquid storage tank at a higher level is opened. Therefore, the liquid in the liquid storage tank starts to flow into a second compressible liquid storage bag on the other side of the smooth plate (seesaw). When sufficient liquid flows into the second compressible liquid storage bag, an imbalanced torque is created. This imbalanced torque further causes the seesaw to incline to one side. The liquid in the second compressible liquid storage bag is squeezed again to transmit the liquid in the storage bag to the above high-level liquid storage tank. Then, the other outlet of the above liquid storage tank is opened, and the liquid flows into the first liquid storage bag. Next, an imbalanced torque is further created. This causes the seesaw to further incline to the other side. Then, the first liquid storage bad is squeezed again. By repeating these steps, a liquid circulating system is formed. FIG. 6 is a schematic view showing the liquid circulating system having a liquid-level difference.

Another objective of the present invention is to provide a liquid circulating system having a liquid-level difference. This circulating system is made of a potential energy regeneration system. This circulating system comprises:

a liquid storage tank;

two compressible liquid storage bags, disposed on left and right sides respectively; and pipe lines, connecting the liquid storage tank to the compressible liquid storage bags, respectively, wherein a process for circulating liquid under a liquid-level difference comprises: allowing the liquid to flow from the above liquid storage tank to the right liquid storage bag; allowing the liquid to flow from the right liquid storage bag to the above liquid storage tank; allowing the liquid to flow from the above liquid storage tank to the left liquid storage bag; and allowing the liquid to flow from the left liquid storage bag to the above liquid storage tank.

The foregoing potential energy regenerating system can create a system for circulating liquid under a liquid-level difference. This system for circulating liquid under a liquid-level difference has a characteristic of different liquid-level. Therefore, it only needs to put a water turbine in an appropriate position of the system for circulating liquid under a liquid-level difference, then the electricity will be generated using the liquid-level difference.

Between a first liquid storage tank and the liquid storage bags of the individual potential energy regenerating system, a liquid storage tank is provided and referred to as a second liquid storage tank. The second liquid storage tank is lower than the first liquid storage, but higher than liquid storage bags of the individual potential energy regenerating system. In hydroelectric power generation, the liquid-level difference between the first and the second liquid storage tanks is used to generate electricity. A hydroelectric generator is placed under the first liquid storage tank, and the outlet of the hydroelectric generator is higher than the inlet of the second liquid storage tank. The liquid flowing through the hydroelectric generator collectively flows into the second liquid storage tank, and then flows into the individual potential energy regenerating system from the outlets, respectively.

Moreover, a potential energy regenerating system array formed of a plurality of potential energy regenerating systems is used, and a plurality of liquid storage tanks is combined into a larger liquid storage tank (referred to as a first liquid storage tank, and also referred to as a highest-level liquid storage tank). It has a highest liquid potential energy for creating a larger amount of water, and this larger amount of water is used to generate a larger volume of electricity.

A further objective of the present invention is to provide an electricity regenerating system, comprising: a first liquid storage tank, having an inlet and an outlet; a second liquid storage tank, wherein the first liquid storage tank is higher than the second liquid storage tank, and the second storage tank is provided with an inlet and a plurality of outlets; a water turbine generator set, generating electricity by using the liquid-level difference between the first liquid storage tank and the second liquid storage tank; a seesaw module array, comprising a plurality of seesaw modules, each of the seesaw modules comprising a rectangular smooth plate, wherein the center of the smooth plate is placed on a base to make both ends of the smooth plate swing up and down; a partition device being provided on the center of the smooth plate for partitioning the smooth plate into two sides and for preventing masses disposed on the smooth plate from sliding from one side to the other side when the smooth plate swings up and down; each side of the smooth plate being provided with a baffle plate perpendicular to the smooth plate for stopping a mass sliding down along the smooth plate; each of the seesaw modules including two liquid storage bag modules; each of the liquid storage bag modules including a compressible liquid storage bag placed on each side of the smooth plate, respectively; the bottom of each compressible liquid storage bag having an access opening; the bottom of the compressible liquid storage bag being fixed on a flat plate; each of the compressible liquid storage bags being lower than the second liquid tank; each of the liquid storage bag modules including a pipe line, one end of which is connected to the access opening of the compressible liquid storage bag and the other end of which branches into two pipe line openings, wherein one opening serves as an input pipe line of the compressible liquid storage bag and is connected to an outlet of the second liquid tank, and the other opening serves as an output pipe line of the compressible liquid storage bag and is connected to the inlet of the first liquid storage tank; the openings of the pipe lines allowing the liquid to flow in one way; an access opening control unit, for controlling all the outlets at the bottom of the second liquid storage tank to be open or closed, so that the compressible liquid storage bags are alternately fed with liquid to achieve a potential energy system.

Another objective of the present invention is to provide an electricity regenerating method using the above electricity regenerating system, comprising the steps of:

making the electricity regenerating system be in a state that no liquid is contained;

using an external force to support the seesaw modules of the electricity regenerating system all in a horizontal state;

making the squeezing weight masses on both sides of each seesaw module be biased to the center of the smooth plate of each seesaw module, wherein all the outlets at the bottom of the second liquid storage tank are in a closed state;

inputting an adequate amount of liquid from the inlet of the first liquid storage tank;

removing the external force for support so that the torque on the smooth plate of each seesaw module becomes imbalanced, and the smooth plate of each seesaw module is inclined to one side; and opening an outlet at the bottom of the compressible liquid storage bag which is in a higher level and is connected to the second liquid storage tank, so as to start to input the liquid to one of the liquid storage bags.

In summary, the present invention discloses a potential energy regenerating system which is constructed by using a simple seesaw structure in cooperation with Pascal's principle and continuous action of universal gravitation. Although the function of this potential energy regenerating system is limited, a liquid circulating system having a liquid-level difference created by the potential energy regenerating system is a regeneration energy source which can be completely controlled and used. An electricity regenerating system uses this liquid circulating system having a liquid-level difference to generate electricity.

DESCRIPTION OF THE PREFERRED EMBODIMENTS

Figure 1:
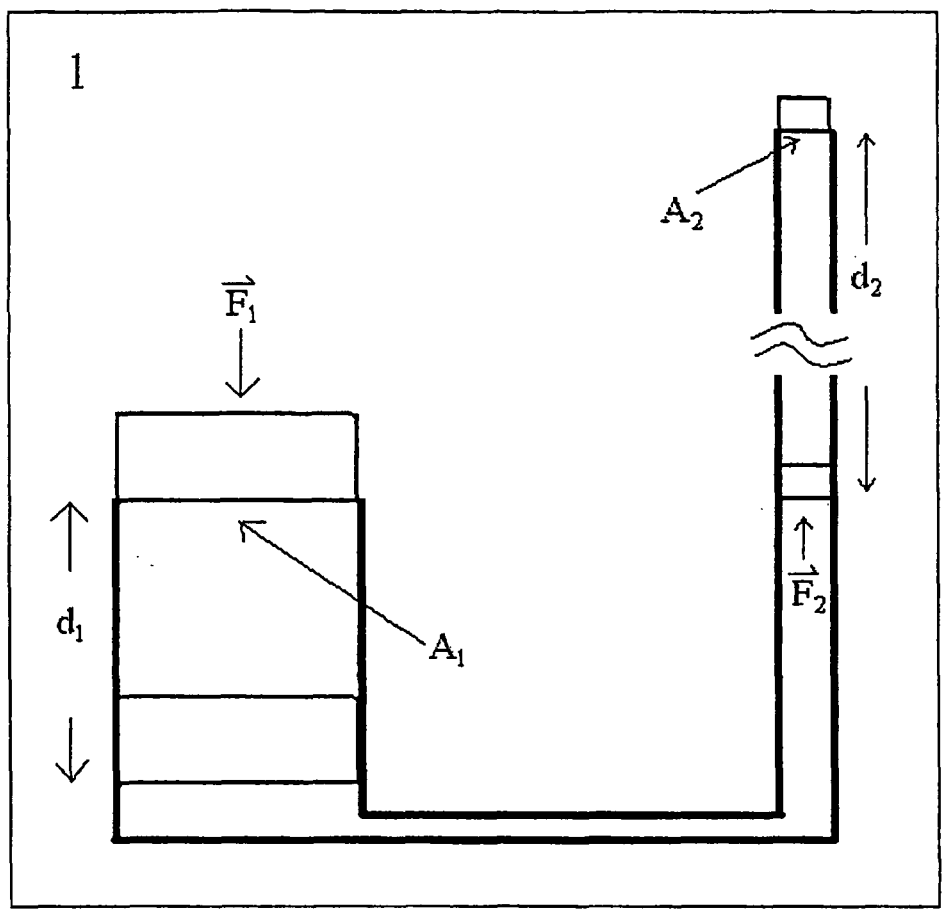
FIG. 1 is a schematic view showing a hydraulic lift, wherein a small piston is lifted up with a large piston nontraditionally.
Figure 2:
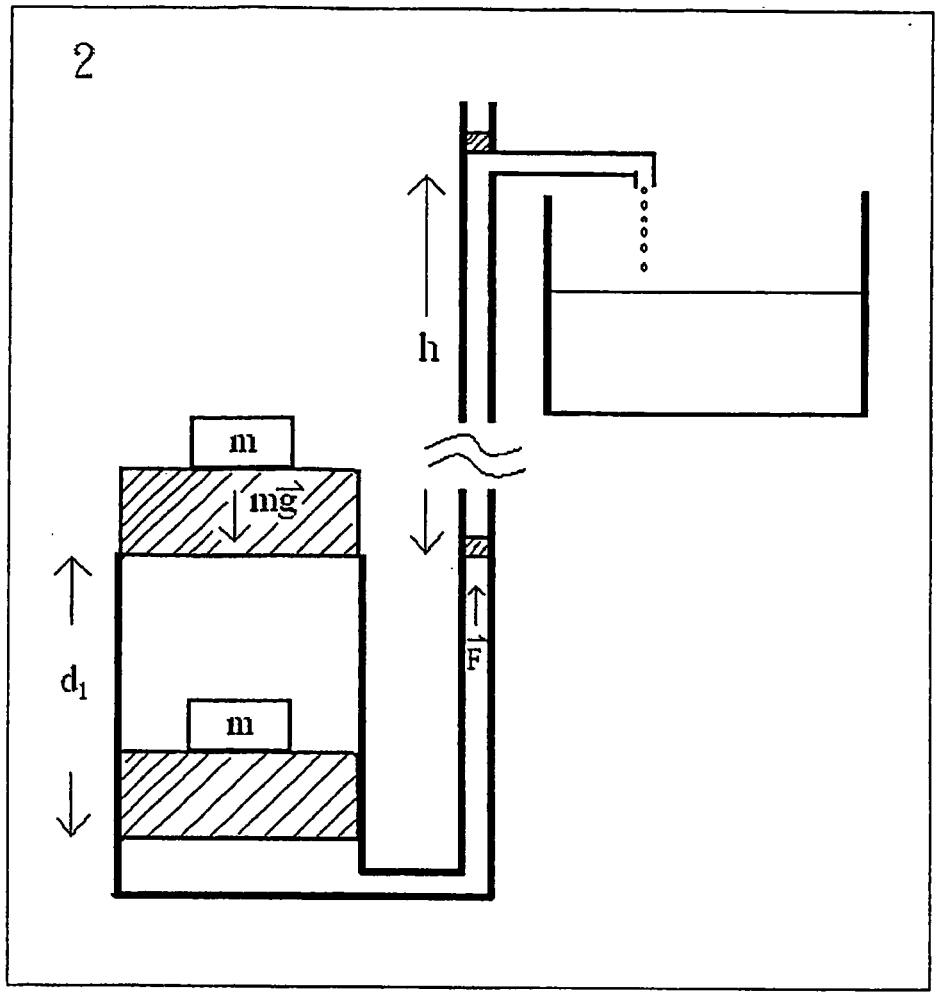
FIG. 2 is a schematic view in which a liquid is transmitted by using Pascal's principle.

Hereinafter, a preferred embodiment of each system according to the present invention will be described with reference to the drawings, wherein the same element is designated with the same reference numeral.

Figure 3:
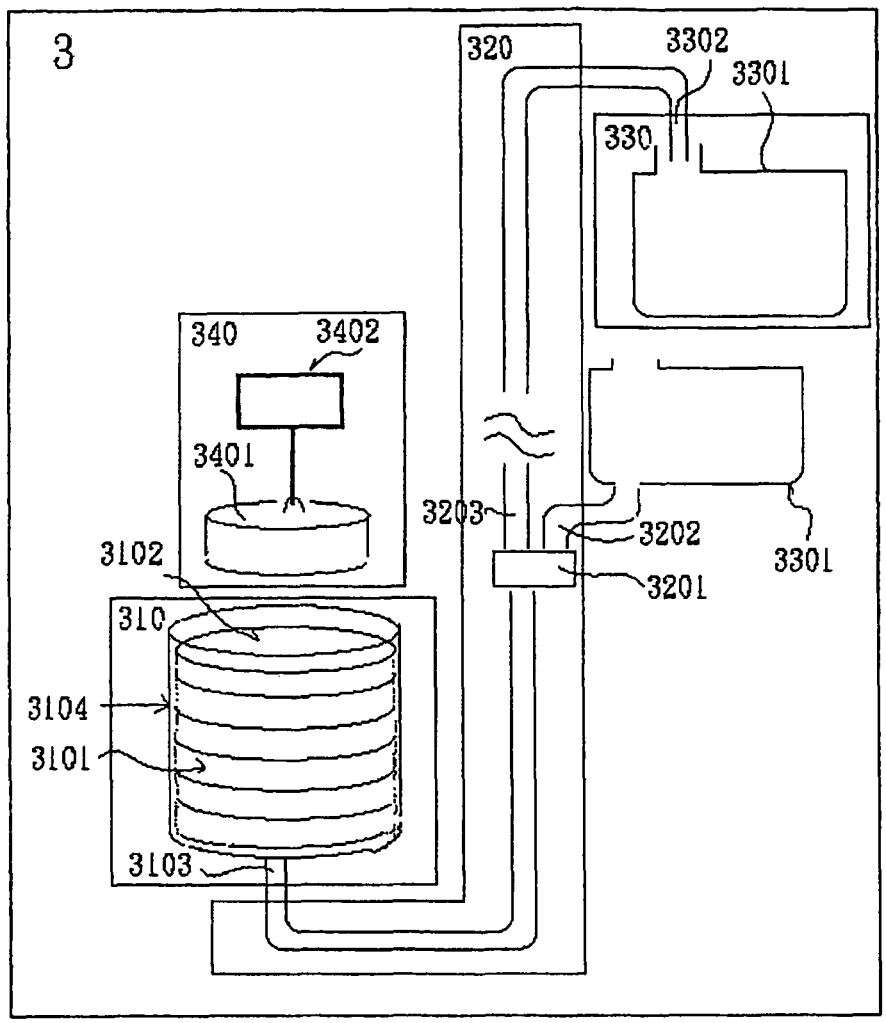
FIG. 3 is a schematic view showing a vertical-type gravity to potential energy conversion system of a preferred embodiment of the present invention.

Please referring to FIG. 3, a liquid potential energy regenerating system of a preferred embodiment of the present invention is shown. The system comprises: a liquid storage bag module 310, a pipe line module 320, a liquid storage tank module 330, and a squeezing weight module 340. A compressible liquid storage bag 3101 is placed in a hollow container 3104. The top 3102 of the liquid storage bag is shaped into a flat form so as to increase contact area for compression. An access opening 3103 having a smaller diameter is provided at the bottom of the liquid storage bag and connected to a pine line which is bent upward and extends to a level higher than the top of the liquid storage bag and then connected to a liquid access opening switch control device 3201. The liquid access opening switch control device 3201 is provided with two openings, one for a pipe line extending upwards and the other for a branch, the two openings being the outlet and inlet of the liquid storage bag, respectively, wherein an opening 3203 is connected to the pipe line extending to the inlet of the liquid storage tank 3301 having a much higher level, and the other opening for a branch is connected to the inlet 3202 of the compressible liquid storage bag 3101.

In the preferred embodiment of the present invention, the liquid access opening switch control device 3201 is a mechanism for one-way flow. For the inlet 3202, when a liquid is not inputted to the liquid storage bag, the inlet 3202 is in a closed state automatically; when a liquid having a higher potential energy flows into the inlet 3202, the weight of the liquid makes the inlet 3202 open and the outlet 3203 is in a closed state; at this time, the liquid flows into the liquid storage bag only from the inlet 3202 but not from the outlet 3203. For the outlet 3203, when the liquid storage bag is squeezed, the inlet 3202 is in a closed state and thus, a fluid flows out upwards only from the outlet 3203 but not from the inlet 3202. An important feature of the present invention is that the liquid cannot flow in and out of the liquid storage bag at the same time.

The liquid stored in the compressible liquid storage bag and the liquid storage tank is incompressible.

The compressible liquid storage bag is placed in a hollow container, a bottom of the container has an opening, and when the compressible liquid storage bag is squeezed, a wall of the hollow container provides a necessary reaction force.

In the preferred embodiment of the present invention, a process for operating the system comprises the steps of:

(1) keeping the liquid storage bag 3101 in an empty state at first;

(2) lifting and stopping a squeezing weight mass 3401 on the top where the liquid storage bag 3101 can reach;

(3) allowing liquid at a level higher than the inlet 3202 to flow into the liquid storage bag 3101 through this inlet 3202 by using its own weight until the liquid storage bag is filled with the liquid or no more liquid flows into the liquid storage bag;

(4) releasing the squeezing weight mass 3401 to squeeze the liquid storage bag 3101, so that the liquid in the liquid storage bag is transmitted to the liquid storage tank 3301 at a higher level; and (5) repeating the steps (1)-(4).

In the above vertical-type liquid potential energy regenerating system, the liquid access opening switch control device plays a quite important role. It allows the liquid to flow into the compressible liquid storage bag and allows the liquid in the bag to be transmitted to the above liquid storage tank by using very little energy.

Figure 8A:
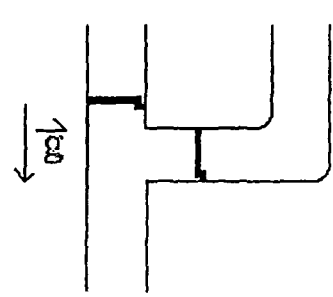
FIG. 8a shows a compressible liquid access opening switch control device of a preferred embodiment of the present invention.

FIG. 8a shows a liquid access opening access opening switch control device of a preferred embodiment of the present invention. The device comprises a vertical pipe line and a branch pipe line extending and bent upwards, wherein $\vec{g}$ is acceleration of gravity (=9.8 m/s²) with a downward direction. The upward pipe line has a cover plate inside, which can be swung up; when the liquid flows upward, the cover plate is swung up under a force, and then a pipe line channel is opened; when no liquid flows upward, the pipe line channel is closed due to the cover plate's own weight. Therefore, a liquid remaining in the upper portion of the vertical pipe line and not yet flowing into the liquid storage tank is prevented from flowing back downward to the lower liquid storage bag.

Figure 8B:
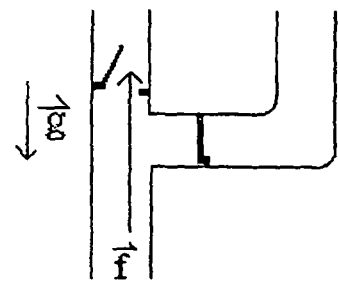
FIG. 8b illustrates that the compressible liquid access opening switch control device allows the liquid to flow out from a compressible liquid storage bag.

FIG. 8b shows a state that a liquid flows upward. The branch pipe line of the liquid access opening switch control device also has a cover plate inside, which can be swung to one side; this branch pipe line of this end is closed due to the cover plate's own weight; when the liquid at a higher level flows in from one side, the cover plate is swung to the opposite side due to the liquid's own weight so as to open the branch pipe line.

Figure 8C:
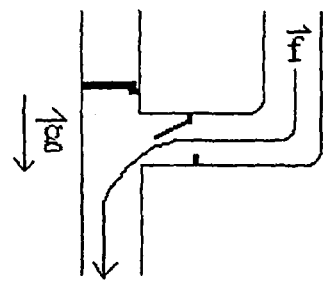
FIG. 8c illustrates that the compressible liquid access opening switch control device allows the fluid to flow into the compressible liquid storage bag.

FIG. 8c shows a state that the liquid at a higher level flows toward a lower level.

Figure 4:
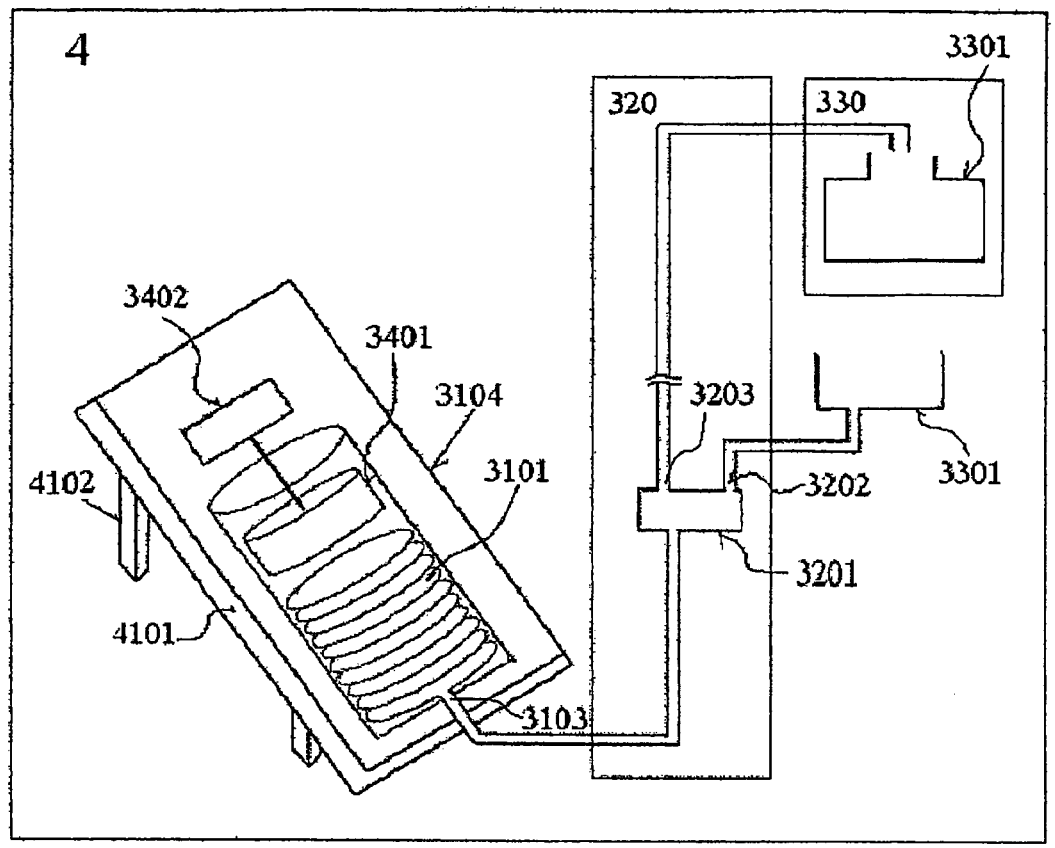
FIG. 4 is a schematic view showing an inclined-type gravity to potential energy conversion system of a preferred embodiment of the present invention.

An Inclined-Type Liquid Potential Energy Regenerating System Using Gravity as its Energy Source Please referring to FIG. 4, an inclined-type liquid potential energy regenerating system according to a preferred embodiment of the present invention comprises: a liquid storage bag module, an inclined plate module, a pipe line module 320, a liquid storage tank module 330, and a squeezing weight module.

The liquid storage bag module comprises a compressible liquid storage bag device, which is a compressing liquid storage bag 3101 having an access opening, the access opening 3103 located at the bottom of the liquid storage bag. The liquid storage bag 3101 is placed in a hollow cylindrical container. The bottom of the container has an opening, through which a pipe line can pass.

The inclined plate module comprises a rectangular inclined plate 4101 inclined by an appropriate angle with respect to the ground. Thus, when a mass is placed on the inclined plate 4101, there is a non-zero and downward component of gravity acceleration in the direction of the inclined plate. The hollow cylindrical container receiving the compressible liquid storage bag is obliquely placed on this rectangular inclined plate 4101, and the access opening of the liquid storage bag is adjacent to the bottom of the inclined plate.

The pipe line module 320 comprises pipe lines and a liquid access opening switch control device 3201, one end of which is connected to the liquid storage bag, the other end of which has two access openings, one for liquid flowing in and the other for liquid flowing out. This liquid access opening switch control device 3201 is located at a level higher than the highest level where the compressible liquid storage bag can reach.

The liquid storage tank module 330 comprises a liquid storage tank 3301 with a bottom higher than the highest level where the liquid storage bag can reach. A pine line connects the outlet of the liquid access opening switch control device 3201 to the inlet 3302 of the liquid storage tank 3301.

The squeezing weight module 340 comprises a squeezing weight mass 3401 and a control device 3402. The squeezing weight mass is placed on the rectangular inclined plate 4101 and located above the compressible liquid storage bag. The control device allows the squeezing weight mass to be lifted and released.

The weight of the squeezing weight mass, the volume of the compressible liquid storage bag, the level where the liquid storage tank is placed, and the angle of the rectangular inclined plate are appropriately selected, so that after squeezing the compressible liquid storage bag with the squeezing weight mass, the liquid is transmitted to the above liquid storage tank, an increment of potential energy is a positive value.

A container wall structure is provided on both side edges of the rectangular inclined plate and above the rectangular inclined plate. When the compressible liquid storage bag is squeezed, the container wall structure provides a necessary reaction force.

The rectangular inclined plate is provided with a rail, and the squeezing weight mass is provided with a wheel device, which is capable of rolling or sliding on the rail of the rectangular inclined plate.

In the preferred embodiment of the present invention, a process for operating the system comprises the steps of:

(1) lifting and stopping a squeezing weight mass 3401 on the top of the inclined plate where the liquid storage bag 3101 can reach;

(2) allowing a liquid at a level higher than the inlet 3202 to flow into the liquid storage bag 3101 from this inlet 3202 due to its own weight until the liquid storage bag is filled with the liquid or no more liquid flows into the liquid storage bag;

(3) releasing the squeezing weight mass 3401 to squeeze the liquid storage bag 3101 in a sliding or rolling manner, so that the liquid in the liquid storage bag is transmitted to the liquid storage tank 3301 at a higher level; and (4) repeating the steps (1)-(3).

Figure 5:
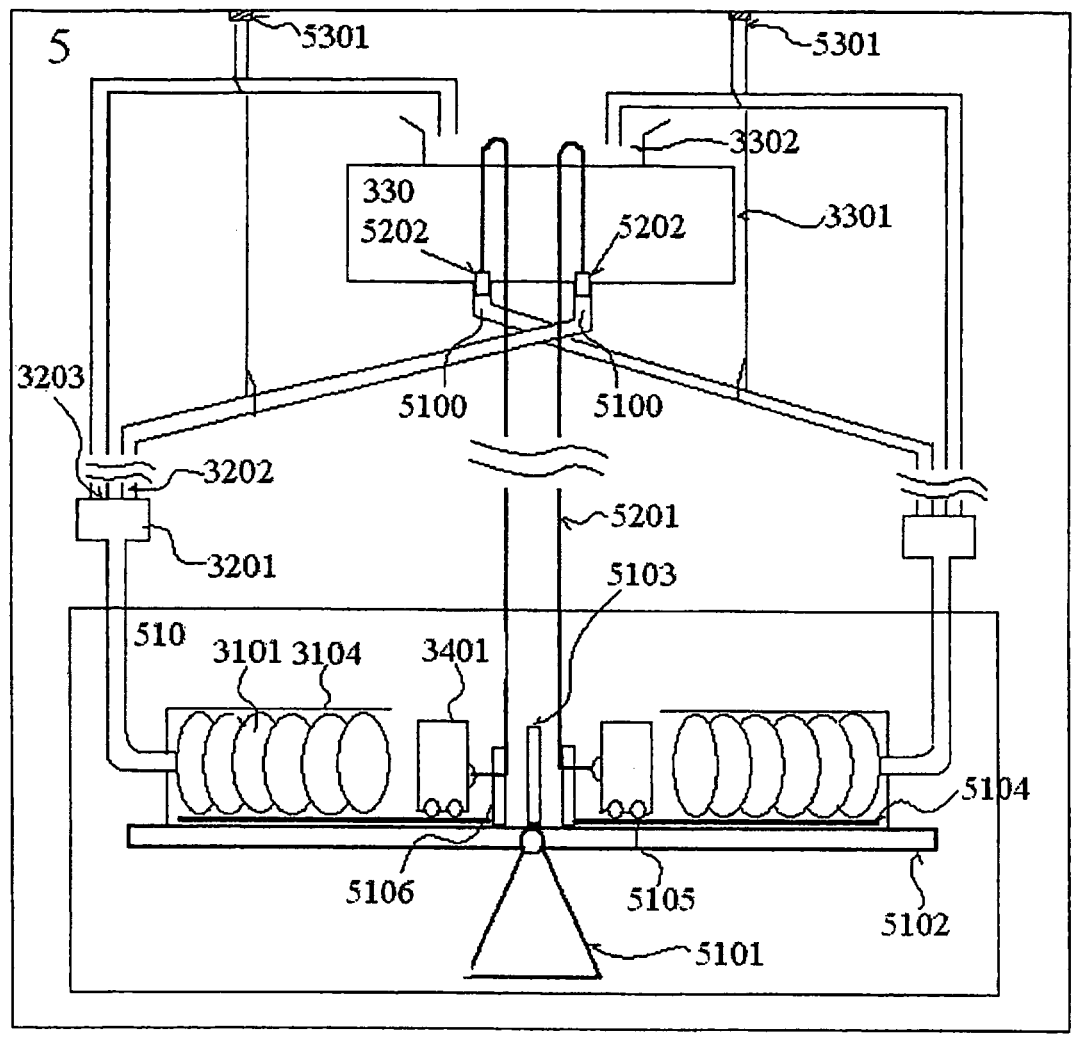
FIG. 5 is a schematic view showing a potential energy regenerating system of a preferred embodiment of the present invention.

A Seesaw-Type Potential Energy Regenerating System Using Gravity as its Energy Source Please referring to FIG. 5, a potential energy regenerating system according to a preferred embodiment of the present invention comprises: a seesaw module 510, two liquid storage bag modules 310, a liquid storage tank module 330, and a compressible liquid access opening switch control device 3201.

The seesaw module 510 comprises a rectangular smooth plate 5102, the center of which is placed on a base 5101, so that both ends of the smooth plate 5102 can swing up and down; a partition device is provided on the center of the smooth plate 5102 for partitioning the smooth plate into two sides and for preventing a mass on one side of the smooth plate from sliding and moving to the other side when the smooth plate 5102 swings up and down.

Each of the liquid storage bag modules 310 comprises a compressible liquid storage bag 3101, placed on each sides of the plate, and the bottom of each liquid storage bag has an access opening 3103. The liquid storage bag is placed in a hollow container 3104. There is an opening at the bottom of the container 3104. The two compressible liquid storage bags are placed on both sides of the plate, respectively. The access openings of the two compressible liquid storage bags are adjacent to both sides of the smooth plate respectively and away from the center of the smooth plate.

The liquid storage stank module 330 comprises a liquid storage tank 3301 with a bottom higher than the liquid access opening switch control device 3201. This liquid storage tank has an inlet 3302. At the bottom of the liquid storage tank, there are two outlets 5100 having pipe lines connected to the liquid input pipe lines of the liquid storage bags on the right and left sides, respectively. A plug 5202 connected to a control rope 5201 is used to control the outlet 5100 to be open or closed. An outlet control rope 5201 connected to the liquid input pipe line of the right liquid storage bag is connected to the left squeezing weight mass 3401 on the seesaw. An outlet control rope 5201 connected to the liquid input pipe line of the left liquid storage bag is connected to the right squeezing weight mass on the seesaw. The plug 5202 has an appropriate weight, and when the corresponding control rope 5201 is released, the plug 5202 will fall down and close the corresponding outlet 5100 due to action of gravity; when the corresponding control rope 5201 is pulled, the corresponded outlet 5100 is opened.

One end of the liquid access opening switch control device 3201 is connected to the access opening 3103 of the compressible liquid storage bag, and the other end has two pipe line openings, wherein one opening is connected to the inlet 3302 of the liquid storage tank, and the other opening is connected to the outlet 5100 of the liquid storage tank. This control device allows the liquid to flow in one way.

A baffle plate 5106 is used to prevent a squeezing weight mass from sliding to the other end. Systems for support and suspension 5301 are used to support the weights of the pipe lines.

The control rope is not stretchable, and the length of the control rope is appropriately selected, so that when the seesaw module inclines to one side and a corresponding squeezing weight mass stops squeezing a corresponding compressible liquid storage bag, the control rope connected to the corresponding squeezing weight mass pulls up the corresponding plug connected to the control rope, due to length of the control rope, and the control rope connected to another squeezing weight mass is released to make the corresponding plug close a corresponding outlet.

A container wall structure is provided for enclosing the compressible liquid storage bags on both sides of the seesaw module. When the compressible liquid storage bag is squeezed, the container wall structure provides a necessary reaction force.

In the preferred embodiment of the present invention, a process for starting this potential energy regenerating system comprises the steps of:

(1) keeping the entire system in a state that no liquid is contained;

(2) supporting the seesaw module to be in a horizontal state with an external force; biasing the squeezing weight masses on both sides toward the center of each smooth plate so as to make the plugs 5202 connected to the control ropes 5201 block their corresponding outlets, respectively;

(3) inputting an adequate amount of incompressible liquid through the inlet 3302 of the liquid storage tank from outside;

(4) removing the external force for support so that the torque on the smooth plate of each seesaw module is in an imbalance state, and one control rope 5201 will open a corresponding outlet; and (5) starting the potential energy regenerating system to operate.

A System for Circulating Liquid Under a Liquid-Level Difference

Figure 6:
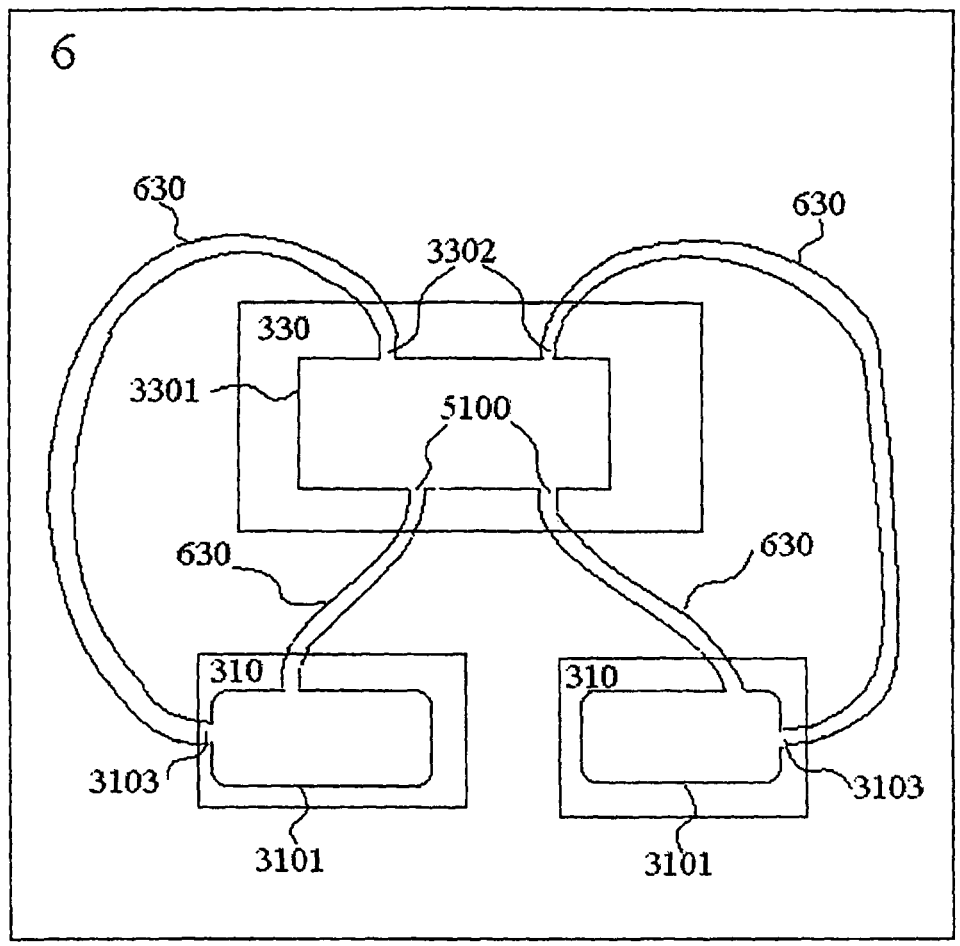
FIG. 6 is a schematic view showing a liquid circulating system under a liquid-level difference created by the potential energy regenerating system, of a preferred embodiment of the present invention.

Please referring to FIG. 6, a system for circulating liquid under a liquid-level difference created by a potential energy regenerating system according to a preferred embodiment of the present invention comprises: a liquid storage tank 3301; two compressible liquid storage bags 3101 disposed on left and right sides respectively; and pipe lines connecting the liquid storage tank 3301 to the compressible liquid storage bags 3101.

In the preferred embodiment of the present invention, the operating process of the system performs the following steps in sequence:

(1) allowing liquid to flow from the above liquid storage tank 3301 into the liquid storage bag 3101 on the right side;

(2) allowing the liquid to flow from the liquid storage bag 3101 on the right side to the above liquid storage tank 3301;

(3) allowing the liquid to flow from the above liquid storage tank 3301 into the liquid storage bag 3101 on the left side; and (4) allowing the liquid to flow from the liquid storage bag 3101 on the left side to the above liquid storage tank 3301.

Figure 7:
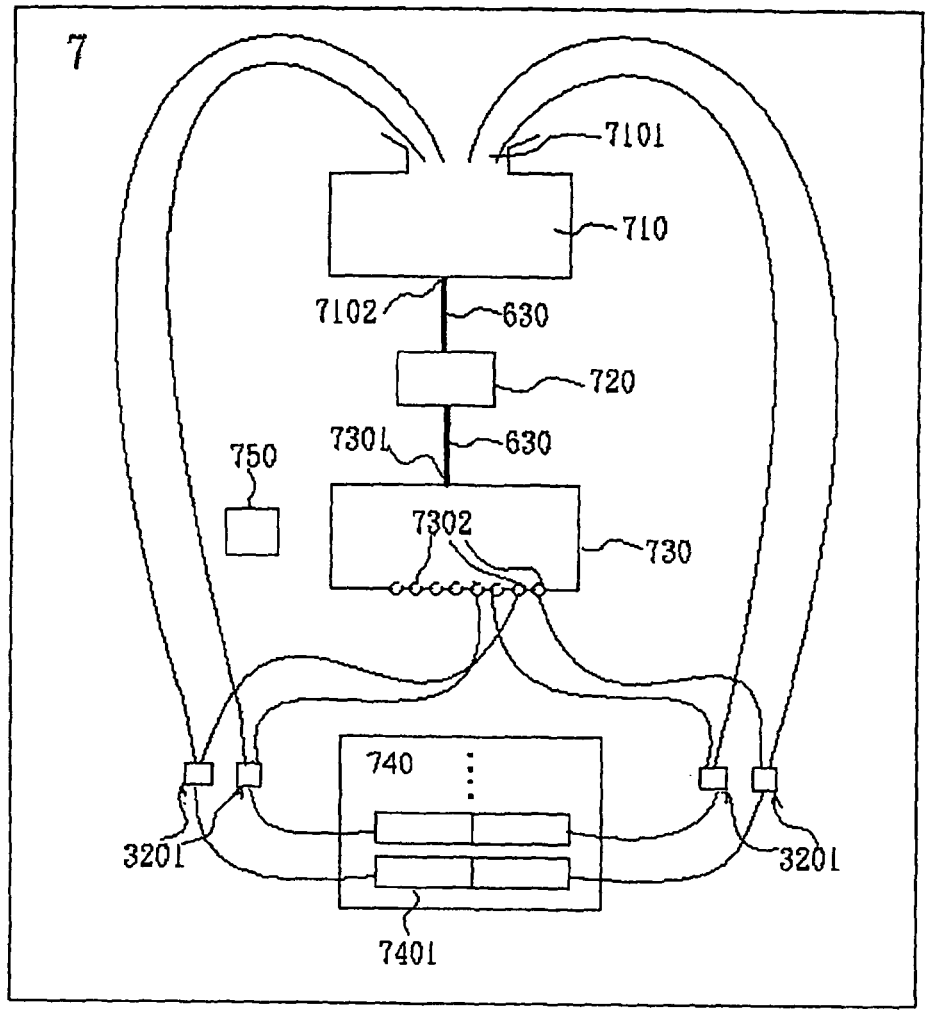
FIG. 7 is a schematic view showing an electricity regenerating system of a preferred embodiment of the present invention.

Please referring to FIG. 7, an electricity regenerating system according to a preferred embodiment of the present invention is shown. The system comprises a first liquid storage tank 710, a second liquid storage tank 730, a turbine generator set 720, a potential energy regenerating system element array 740 including a plurality of potential energy regenerating system elements 7401, and an outlet control unit 750.

The first liquid storage tank 710 (also referred to as the highest level liquid storage tank) has an inlet 7101 and an outlet 7102.

The second liquid storage tank 730 (also referred to as the second-high level liquid storage tank) has an inlet 7301 and a plurality of outlets 7302. Moreover, the first liquid storage tank 710 is higher than the second liquid storage tank 730.

The turbine generator set 720 can uses the liquid-level difference between the first liquid storage tank 710 and the second liquid storage tank 730 to generate electricity.

The potential energy regenerating system element array 740 comprises a plurality of potential energy regenerating system elements 7401, wherein each of the potential energy regenerating system elements 7401 is implemented by the foregoing potential energy regenerating system module.

The outlet control unit 750 is used to control all the outlets 7302 at the bottom of the second liquid storage tank 730 to be open or closed, so that two liquid storage bags 3101 in each potential energy regenerating system element 7401 can be alternately fed with liquid and become a separate potential energy regenerating system.

A process for starting the above electricity regenerating system comprises the steps of:

(1) keeping the entire system in a state that no liquid is contained;

(2) supporting the smooth plate 5102 of each potential energy regenerating system with an external force unit all in a horizontal state, and biasing the squeezing weight masses 3401 in the potential energy system elements all toward the center of each smooth plate, so that the outlets 7302 at the bottom of the second liquid storage tank 730 are in a closed state;

(3) inputting an adequate amount of incompressible liquid through the inlet 7101 of the first liquid storage tank from outside;

(4) removing the external force for support so that the torque on the smooth plate 5102 become imbalanced, and the smooth plate 5102 is inclined to one side;

(5) in the two liquid storage bags 3101 of each potential energy regenerating system unit, opening an outlet 7302 of a liquid storage bag 3101 at a higher level connected to the bottom of the second liquid storage tank; and (6) performing the process for operating the potential energy regenerating individually for each potential energy regenerating system; and (7) generating electricity by the turbine generator.

As described above, the outlet control of the preferred embodiment of the present invention uses control ropes and plugs to control the outlet to be open or closed. The important result resulted from the preferred embodiment is that electricity can be obtained in a mechanical way and by action of gravity. However, it should be noted that for the above mechanism, those skilled in the art can use a microcomputer to control the outlet to be open or closed without departing from the spirit and scope of the present invention.

The above individual preferred embodiments are exemplary only, but not limitative. Modifications or changes which are equivalently made without departing from the spirit and scope of the present invention should fall within the scope of the accompanying claims.

What is claimed is:

1. A potential energy regenerating system, comprising:

a seesaw module, comprising a rectangular smooth plate, a center of which is placed on a base, so that both ends of the smooth plate are capable of swinging up and down, a partition device being provided on the center of the smooth plate for partitioning the smooth plate into two sides, each side of the smooth plate being provided with a baffle plate perpendicular to the smooth plate for stopping a mass sliding down along the smooth plate, the baffle plate having an opening through which a pipe line passes;

two liquid storage bag modules, each comprising a compressible liquid storage bag, placed on both sides of the plate of the seesaw module, respectively, a bottom of each compressible liquid storage bag having an access opening and fixed on a flat plate;

a liquid storage tank module, comprising a liquid storage tank with a bottom higher than that of a liquid access opening switch control device, the liquid storage tank having an inlet and having two outlets at a bottom of the liquid storage tank, the two outlets being connected to the liquid input pipe lines of the liquid storage bags on the right and left sides, respectively, each of the outlets being provided with a plug connected to a control rope, for controlling the outlets to be open or closed, the control rope connected to the liquid input pipe line of the right compressible liquid storage bag being connected to the left squeezing weight mass of the seesaw module, the control rope connected to the liquid input pipe line of the left compressible liquid storage bag being connected to the right squeezing weight mass of the seesaw module, the plug having an appropriate weight, wherein when the control rope is released, a corresponding plug falls down to close a corresponding outlet, and when the control rope is pulled, the corresponding outlet is opened; and the liquid access opening switch control device, one end of which is connected to the access opening of the compressible liquid storage bag, the other end of which has two pipe line openings, wherein one opening is connected to the inlet of the liquid storage tank, and the other opening is connected to a corresponding outlet of the liquid storage tank, the liquid access opening switch control device allowing liquid to flow in one way.

2. The potential energy regenerating system as claimed in claim 1, wherein the control rope is not stretchable, and the length of the control rope is appropriately selected, so that when the seesaw module inclines to one side and a corresponding squeezing weight mass stops squeezing a corresponding compressible liquid storage bag, the control rope connected to the corresponding squeezing weight mass pulls up the corresponding plug connected to the control rope, due to length of the control rope, and the control rope connected to another squeezing weight mass is released to make the corresponding plug close a corresponding outlet.

3. The potential energy regenerating system as claimed in claim 2, wherein a container wall structure is provided for enclosing the compressible liquid storage bags on both sides of the seesaw module, and when the compressible liquid storage bag is squeezed, the container wall structure provides a necessary reaction force, wherein each of the left and right sides of the plates is provided with a rail, and the squeezing weight mass is provided with a wheel device, which is capable of rolling on the rail.

4. A method of starting a potential energy system, which is applied to a potential energy regenerating system as claimed in any one of claims 1-3, the starting method comprising the steps of:
- making the potential energy regenerating system be in a state that no liquid is contained;
- using an external force to support the smooth plate of the seesaw module to be in a horizontal state, making the squeezing weight masses on both sides of the smooth plate be biased toward the center of the smooth plate, so that the plugs connected to the control ropes block their corresponding outlets;
- inputting an adequate amount of liquid from the inlet of the liquid storage tank; and
- removing the external force for support so that the torque on the smooth plate is in an imbalance state, and one of the control ropes opens a corresponding outlet to start the potential energy regenerating system.

5. An electricity regenerating system, comprising:
- a first liquid storage tank, having an inlet and an outlet;
- a second liquid storage tank having an inlet and a plurality of outlets, the first liquid storage tank being higher than the second liquid storage tank;
- a water turbine generator set, generating electricity by using a liquid-level difference between the first liquid storage tank and the second liquid storage tank;
- a seesaw module array, comprising one or more seesaw modules, each of the seesaw modules comprising a rectangular smooth plate, a center of which is placed on a base so that both ends of the smooth plate are capable of swinging up and down; a partition device being provided on the center of the smooth plate for partitioning the smooth plate into two sides and for preventing masses disposed on the smooth plate from sliding from one side to the other side when the smooth plate swings up and down; each side of the smooth plate being provided with a baffle plate perpendicular to the smooth plate for stopping a mass sliding down along the smooth plate; each of the seesaw modules including two liquid storage bag modules; each of the liquid storage bag modules including a compressible liquid storage bag placed on each side of the smooth plate; a bottom of each compressible liquid storage bag having an access opening; the bottom of the compressible liquid storage bag fixed on a flat plate; the compressible liquid storage bags being lower than the second liquid tank; each of the liquid storage bag modules including a pipe line, one end of which is connected to the access opening of the compressible liquid storage bag and the other end of which branches into two pipe line openings, wherein one opening serves as an input pipe line of the compressible liquid storage bag and is connected to an outlet of the second liquid tank, and the other opening serves as an output pipe line of the compressible liquid storage bag and is connected to the inlet of the first liquid storage tank; the openings of the pipe lines allowing liquid to flow in one way; and
- an access opening control unit, for controlling all the outlets at the bottom of the second liquid storage tank to be open or closed, so that the compressible liquid storage bags are alternately fed with liquid to achieve a potential energy system.

6. The electricity regenerating system as claimed in claim 5, wherein the access opening control unit is one of a mechanical device and a microcomputer-controlled device.

7. An electricity regenerating method, which is applied to the electricity regenerating system as claimed in any one of claims 5 and 6, the electricity regenerating method comprising the steps of:
- making the electricity regenerating system be in a state that no liquid is contained;
- using an external force to support all the smooth plates of the seesaw modules of the electricity regenerating system to be in a horizontal state;
- making the squeezing weight masses on both sides of the smooth plate of each seesaw module be biased toward the center of the smooth plate, wherein all the outlets at the bottom of the second liquid storage tank are in a closed state;
- inputting an adequate amount of liquid from the inlet of the first liquid storage tank;
- removing the external force used for support so that a torque on the smooth plate of each seesaw module becomes imbalanced, and the smooth plate is inclined to one side, then the system will automatically; and
- opening an outlet at the bottom of the compressible liquid storage bag which is in a higher level and is connected to the second liquid storage tank, so as to start to input the liquid to one of the liquid storage bags.

* * * * *